Figure 1:
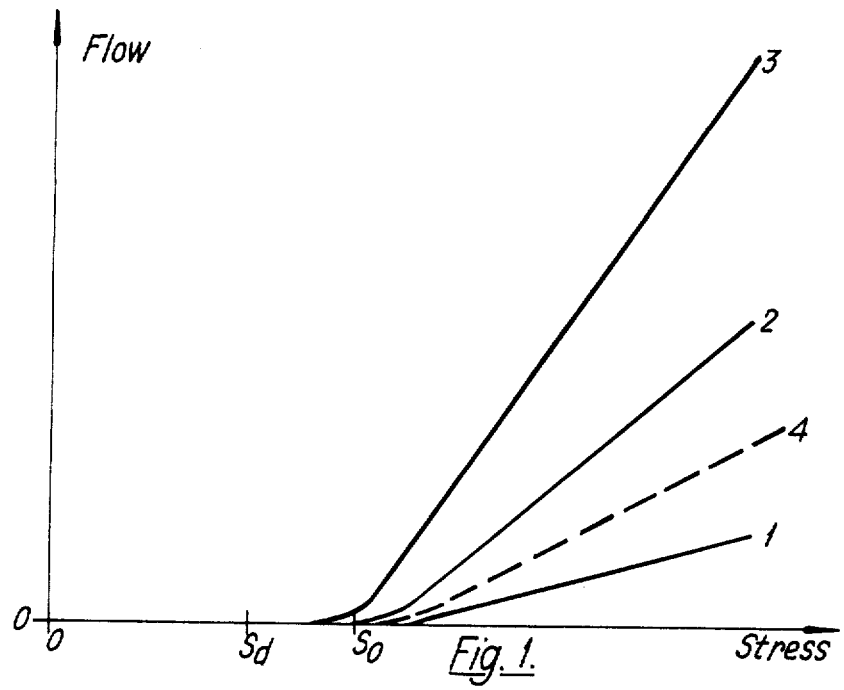

United States Patent [19]

Foord et al.

[11] 3,996,413
[45] Dec. 7, 1976

[54] SHEATHED STRANDED CABLE COMPLETELY FILLED WITH WATER BLOCKING COMPOSITION

[75] Inventors: Stanley George Foord, Harlow; Walter Eric Simpson, Ware; Peter Ivan Aitken Martin, Bishops Stortford, all of England

[73] Assignee: International Standard Electric Corporation, New York, N.Y.

[22] Filed: Mar. 24, 1975

[21] Appl. No.: 561,540

Related U.S. Application Data

[62] Division of Ser. No. 298,811, Oct. 19, 1972, Pat. No. 3,903,013.

[52] U.S. Cl. .............................. 174/23 C; 156/48; 174/116; 252/317
[51] Int. Cl.² ............... H02G 15/20; H01B 7/28
[58] Field of Search ............ 174/23 C, 23 R, 25 C, 174/116, 25 R; 252/59, 63, 63.2, 316, 317; 156/48; 208/20, 21; 106/270, 272; 260/28

[56] References Cited

UNITED STATES PATENTS

| | | | |
|---|---|---|---|
| 3,271,177 | 9/1966 | Rumberger | 106/272 |
| 3,347,974 | 10/1967 | Arendt et al. | 174/23 R |
| 3,607,332 | 9/1971 | Wingfield | 106/272 X |
| 3,683,104 | 8/1972 | Woodland et al. | 174/116 |
| 3,717,485 | 2/1973 | Larson | 260/28 |
| 3,733,225 | 5/1973 | Moody | 174/23 C X |
| 3,733,426 | 5/1973 | Kaufman et al. | 174/23 C |
| 3,745,231 | 7/1973 | Eager, Jr. et al. | 174/116 X |

FOREIGN PATENTS OR APPLICATIONS

| | | | |
|---|---|---|---|
| 1,174,495 | 3/1959 | France | 174/25 C |
| 1,952,845 | 4/1971 | Germany | 174/23 C |
| 1,936,872 | 3/1971 | Germany | 174/23 C |
| 1,116,175 | 6/1968 | United Kingdom | 174/23 C |

*Primary Examiner*—Arthur T. Grimley
*Attorney, Agent, or Firm*—J. B. Raden; H. J. Holt

[57] ABSTRACT

A water blocking compound for sheathed stranded cables, the compound being a gel consisting of a major proportion by weight of a substantially non-volatile liquid in which has been dispersed a minor proportion by weight of a solid gellant which is insoluble in said liquid and which does not melt below 100° C, the gel being substantially devoid of any gellant which is soluble in the liquid and/or melts below 100° C.

6 Claims, 5 Drawing Figures

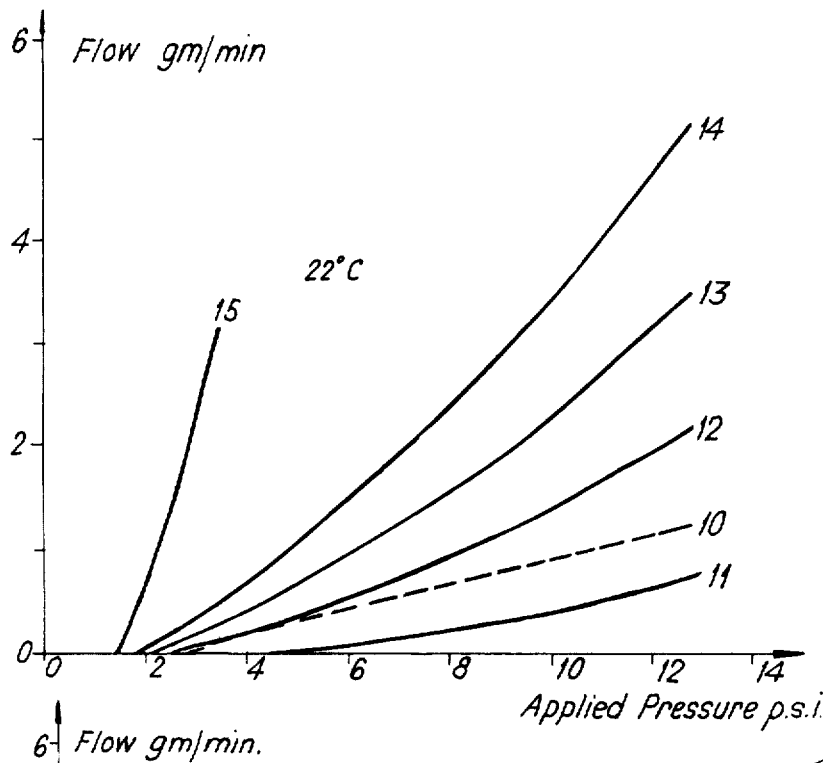
Fig. 3.
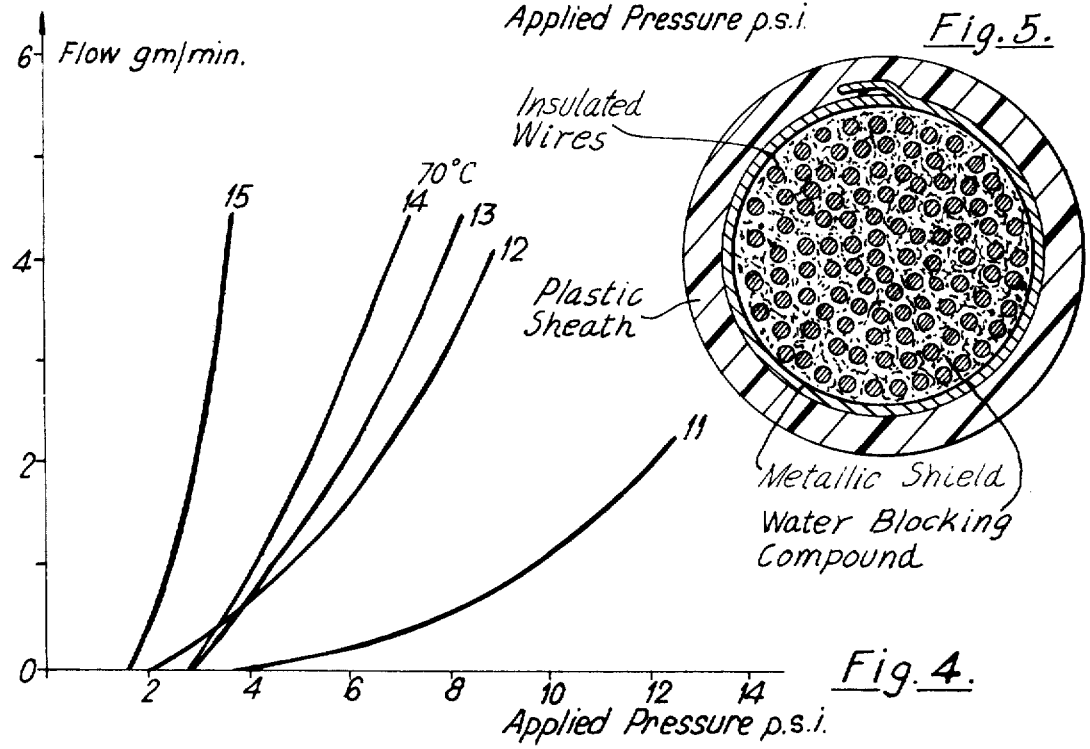
Fig. 4.
Fig. 5.

SHEATHED STRANDED CABLE COMPLETELY FILLED WITH WATER BLOCKING COMPOSITION

This is a division of application Ser. No. 298,811, filed Oct. 19, 1972, now U.S. Pat. No. 3,903,013.

This invention relates to water-blocking compounds for sheathed stranded cables.

According to the present invention there is provided a water blocking compound for sheathed stranded cables, the compound being a gel consisting of a major proportion by weight of a substantially non-volatile liquid in which has been dispersed a minor proportion by weight of a solid gellant which is insoluble in said liquid and which does not melt below 100° C, the gell being substantially devoid of any gellant which is soluble in the liquid and/or melts below 100° C.

The invention also resides in a sheathed stranded cable incorporating a water blocking compound of the type defined in the preceding paragraph.

Figure 2:
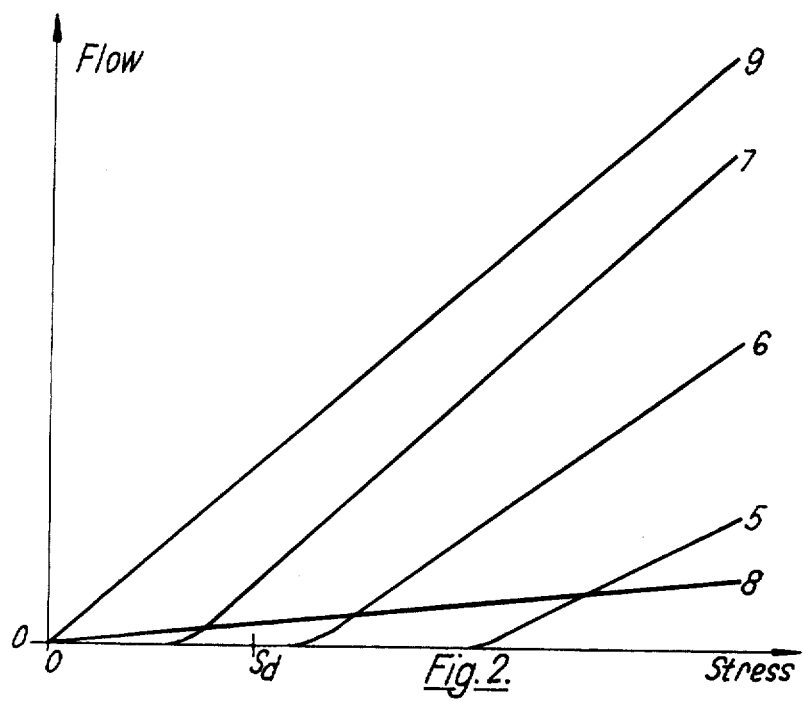

There follows a description of water blocking compounds embodying the invention in preferred forms. For the purposes of comparison reference is also made to the properties of petrolatum which previously has been used as a water blocking compound for sheathed stranded cables. The description refers to the accompanying drawings in which:

FIG. 1 depicts the flow curves characteristic of a hypothetical 'ideal' filling compound, FIG. 2 depicts the flow curves of petrolatum and viscous oils at various temperatures, and FIGS. 3 and 4 depict flow curves at respectively 22° C and 70° C of a set of gels formulated from different grades of aromatic extract in which an activated modified clay has been dispersed.

FIG. 5 is a schematic cross-sectional view of a completely filled sheathed stranded cable of the invention.

As a basis for specifying the required material properties of a water blocking compound it is helpful to consider two specific features relating respectively to manufacture and final properties of the cable. In manufacture it is possible to pre-coat the individual wires or insulated conductors with filling compound prior to the stranding operation, but it is preferred to pump the compound into the dies of the stranding machine as each layer is formed, to ensure complete filling of the cable. Whatever procedure is adopted the flow properties of the compound should be such as to enable a reasonable flow rate to be achieved with a convenient value of pumping pressure. At the same time the compound, as it appears in the finished cable, should not flow when subjected to a specified gradient of hydrostatic pressure. In other words the material should show a measure of plasticity providing a yield stress exceeding a certain specified value. As a minimum this gradient must exceed that set by the weight of compound in a vertically held open-ended length of cable, in order to prevent drainage from the cable. Gradients of this order are commonly quoted in test specifications for filled plastic insulated telephone subscriber cables.

These two criteria for the consistency of a filling compound are fundamental, and must apply for all conditions of exposure, in particular at all temperatures encountered during manufacture and subsequent service of the cable. They are exemplified by the relationships, shown in FIG. 1, between flow and shear stress of a hypothetical compound. In this Figure:

$S_d$ is the stress below which drainage or movement of the compound must not occur, and $S_o$ is the stress at which compound begins to flow.

Curves 1 – 3 are idealised characteristics of a suitable compound, at three temperatures. Curves 1 and 3 are for the minimum and maximum service temperatures of the cable; curve 2 is for ambient temperature during manufacture. Curve 4 is the flow curve of the material at the lowest temperature at which it can conveniently be pumped. Below this temperature the apparent viscosity, the ratio of applied shearing stress to rate of shear, becomes too large to achieve adequate flow rates at suitable pumping pressures.

It will be noted that:
a. Drainage or longitudinal flow of compound in the cable does not occur, over the whole service temperature range
b. The compound can be pumped without preheating
c. At the bottom service temperature flow will occur at a sufficiently moderate stress to permit flexing of the cable without damage to its constituent parts even though the compound may have too high an apparent viscosity for pumping.

These requirements have all been concerned with rheological properties. Certain additional requirements need to be met by an ideal filling compound. The compound must be immiscible with water, and should posses the following features:

d. Thermal expansion coefficient over the cable service temperature range should be as low as possible, to prevent formation of voids during cooling. Such voids provide a seepage path for water, particularly between stranded conductors and an outer sheath.
e. The compound must not attack insulating and sheathing materials to an extent which will significantly detract from their performance.
f. On standing, the compound must not divide into separate phases, if any one of these separated phases will not meet the performance requirements of the original compound.
g. In the case of telecommunication or power cables the electrical conductivity must be low.
h. The compound must be free from toxic hazards, and have handling properties acceptable to manufacturing and installation operating personnel; thus it should not be too tacky.
i. The compound must have an acceptably low vapour pressure so that over a reasonable period of service in a cable its properties do not significantly deteriorate from evaporation through vapour permeable cable sheathing.

Petrolatum, a mixture of microcrystalline petroleum wax and oil, has been widely used, since it shows plastic behaviour, i.e. it exhibits a non zero yield stress beneath which there is no flow, as shown by curves 5 – 7 in FIG. 2, which are flow curves characteristic for low, medium and high temperatures respectively. The plasticity is induced by the microcrystalline wax. However the wax melts or dissolves in the oil as the temperature is increased, resulting in a lower yield stress and a tendency to drain at high temperature (curve 7). On cooling, some wax separates, giving at first the satisfactory characteristic of curve 6, but further cooling results in further increase in the yield stress and the characteristic is given by the curve 5. At this stage the apparent viscosity at normal pumping pressures is too large to give an adequate flow rate. This stage is commonly reached above normal factory temperatures, and it becomes necessary to heat the compound to pump it, an undesirable and expensive expedient. Still further cooling below factory ambient may raise the yield stress so much that flexibility of the cable is impaired.

Compositional variations on the basic mixture enable the service range to be raised or lowered, but not appreciably extended. For example, petroleum waxes alone have been proposed, but have to be pumped hot and have insufficient flexibility at low temperature. A further disadvantage of compositions containing petroleum wax is the large decrease in volume when the wax solidifies or comes out of solution on cooling. A 10% shrinkage has been observed on cooling a commercial petrolatum filling compound from 80° C to room temperature.

Water blocking gels compounded in accordance with the present invention may include in addition to the non-volatile liquid and solid gellant minor proportions of other ingredients such as anti-oxidants, stabilisers, colour base, and dispersing agents. In particular, where the liquid is non-polar, as will generally be the case for telecommunications cables, the use of certain types of gellant will require the admixture of a small quantity of polar additive in order for the gellant to function effectively with the non-polar type of dispersant.

A wide range of liquids can be used as the major constituent, depending upon the type of cable in which it is to be used. For a particular application the choice is narrowed by the need to meet additional requirements. Cables for electrical purposes for instance will typically be required to operate in a temperature range within the limits of $-30°$ C to $+100°$ C. The liquid should not significantly attack insulating and sheathing materials, in particular polyethylene and polypropylene, and should have low electrical conductivity. For such purposes we have found that hydrocarbon-based liquids derived from petroleum may be used, such as the class of materials known in the industry as 'Aromatic Extracts', or 'Process Oils'. These are relatively low cost materials whose principal uses are as extenders, plasticisers and general processing aids for rubber and plastic compositions. Typically they comprise 75 – 85% by weight aromatic hydrocarbons, 5 – 15% saturated hydrocarbons, and sulphur containing polar compounds making up the balance. The hydrocarbons have molecular weights generally within the range of 300 – 600, and are practically non-volatile at 100° C. However oils containing a lower proportion of aromatics and a greater proportion of saturated hydrocarbons may be used.

A number of solid materials are known which act as gellants when mixed with liquids in which they do not dissolve, for example granulated mica, ultrafine silica, and certain natural clays. These vary in efficiency depending upon the nature of the liquid with which they are compounded and the ability to activate the interface between solid and liquid. We have found that a group of specially processed clays sold under the Registered Trade Marks BENTONE or BARAGEL are particularly effective when used in conjunction with hydrocarbon oils of the type described above. These materials are a class of product resulting from cation exchange reactions between organic bases and certain clay minerals and are supplied as fine powders, the particles of which have the form of platelets with a high ratio of diameter to thickness. The organic constituent in the surface of the particles is solvated by various liquids. In the case of non-polar liquids such as hydrocarbon oils solvation is assisted by the addition of small amounts of polar liquids such as alcohols, ketones, esters, etc.

For the preparation of such compositions the major liquid constituent is first premixed with the solid gellant in any conventional type of medium speed mixer. Further additives are incorporated either with the liquid or the solid or added to the premix. The premix is then passed through a mill such as a colloid mill in which it is subjected to high shearing forces which thoroughly delaminate and disperse the gellant and produce a stable gel. Typically the amount of gellant lies in the range 0.5 to 10% by weight of the total composition.

Before giving examples of compositions, a brief description will be given of the method used for testing the flow properties, and their relationship to performance during manufacture and service of filled cables. The flow requirements have been indicated qualitatively in FIG. 1, which shows flow as a function of shear stress. Quantitative results have been obtained by the use of an extrusion rheometer in which fluid pressure is applied to the compound in a cylinder causing it to flow out through a small orifice, the rate of extrusion being determined as a function of applied pressure (which is related to the stress). The orifice diameter was chosen to be comparable with that of the interstices in a typical stranded cable, and the orifice length to be ten times the diameter. A larger size of orifice was used for firm compounds than for soft ones.

FIGS. 3 and 4 show a series of flow curves (11–15) of gels obtained with five different grades of aromatic extracts supplied by BP Trading under the classification Light 1S, 501 LT, 1665, 160/95 and 620/95 respectively (subsequently re-classified as Everflex 81, 553, 84, 65 and 58 respectively). These aromatic extracts, which have less than 40% paraffinic carbon, were compounded with a fixed quantity of Baragel 24 (modified clay) and propylene carbonate (polar additive), according to the following composition:

| | |
|---|---|
| Aromatic extract | 94 parts by weight |
| Baragel 24 | 6 parts by weight |
| Propylene carbonate | 0.6 parts by weight |

The flow curves are characterised by:
a. a threshold pressure $P_o$ below which no flow occurs
b. a region of pressure P greater than $P_o$ where fluid flow occurs, the slope of the curve (i.e. the incremental rate of increase of flow rate per unit increase of pressure) being an inverse measure of the true viscosity.

FIG. 3 refers to measurements made at room temperature (22° C) with an extrusion orifice diameter of 0.076 inch (2mm). FIG. 4 shows results on the same compounds at 70° C, using a 0.030 inch (0.76 mm) orifice. The smaller orifice for 70° C was necessary because of the considerable reduction in viscosity at this temperature, but simple theory of capillary flow of a Bingham material having a specified yield point enables an approximate conversion to be made to a common orifice diameter.

The net conclusion from these curves is that while the true viscosity (proportional to the incremental rate of increase of pressure per unit increase of flow rate) for pressures exceeding $P_o$ is of the same order as that of the base liquids and decreases by 20–40 fold from 22° C to 70° C, the yield stress remains practically constant in agreement with the hypothetical curves of FIG. 1. Furthermore the yield pressure $P_o$ has the same order of magnitude for all the compounds illustrated in FIGS. 3 and 4, i.e. of the order 2 – 3 lb per square inch (psi). The yield strength necessary to prevent drainage of a filling material under its own weight in a vertical cable depends upon the diameter of the interstices between strands, but in a test such as is described above with a 0.076 inch orifice the corresponding value of $P_o$ required is of the order 0.05 psi. A considerable safety margin would be added in practice, but a $P_o$ value of 0.5 psi can be considered adequate.

The slope of the flow characteristic at which the viscosity becomes excessively high for pumping depends upon the manufacturing set-up used for transferring the filling compound during the stranding operation. However, practical experience in the use of petrolatum as a filler enables a limiting characterisitc to be approximately positioned at curve 10 of FIG. 3.

It is of course the value of the apparent viscosity at the actual pumping pressure (proportional to flow rate per unit of pressure) which is the critical parameter concerning suitability for pumping, but since suitable pumping pressures are not the same for all varieties and sizes of cable, and also acceptable flow rates will depend in part upon the geometry of the cable, it is convenient to provide a rough guide of suitability for pumping in terms of a given flow rate etc. at an arbitrary pressure. We have found a suitable guide to the limit of suitability for pumping is the requirement that under an extrusion pressure of 12 psi there should be a flow rate of not less than 1 gm/minute through an orifice 2 mm in diameter and 2 cm long. This guide is based on the assumption that the flow properties of the compound do not depart radically from Bingham flow and that the yield pressure of the compound in an orifice with the above aspect ratio (10:1) lies in the region 0.5 to 3 psi. The minimum flow rate will have to be achieved at a temperature of about 22° C if room temperature pumping is desired.

Properties of the above compositions are given by way of example, but are not to be regarded as limiting. The characteristic flow curves may be varied at will by modifying the quantities of gellant and liquid polar additive, separately or simultaneously, relatively to that of the major liquid constituent.

It is to be noted that due to insensitivity of the yield stress of these compositions to temperature, the ball-and-ring softening point commonly quoted for filling compounds is in all cases above 100° C. For comparison, the corresponding softening points of petrolatums at present used cannot be raised much above 65° – 70° C without detriment to pumping characteristics and low temperature flexibility. Another feature of these gels formed with a gellant which is insoluble in the dispersant and does not melt below 100° C is a low thermal expansion due to absence of a change of state of the gellant during temperature cycling. For example a typical volume change on cooling from 80° C to room temperature is approximately 4%, which must be compared with a corresponding change of approximately 10% for petrolatums. A further feature is that there was no appreciable phase separation when these compounds were stored for an extended period at 80° C; oil separation is commonly observed when petrolatums with drop points as high as 70° are stored for equal periods at 50° C.

A smaller quantity of gellant was employed in making gels from the following range of relatively high viscosity (~35 centi-stokes at 100° C) oils having a higher paraffinic carbon content:

Catenex 79 (Shell-Mex & BP), Servis 155 (Gulf), Cylrex PM (Mobil), and Sunpur 2280 (British Sun Oil Company). In each case a gel satisfactory for use as a water blocking compound was obtained by blending 96½ wt% of the oil with 3 wt% of Bentone 38 and 0.45 wt% polar additive in the form of propylene carbonate.

The higher paraffinic carbon content of these oils (typically in the region of 70 ± 5% paraffinic carbon) provides a reduced temperature coefficient of viscosity. Another difference is that the molecular weight of these oils is approximately twice that of the aromatic oils previously referred to, and yet they are not too viscous to be readily blended with gellant at room temperature. These factors militate toward producing with less gellant a water blocking gel that is less liable to degrade at high service temperatures certain cable insulation and cable sheathing materials such as polyolefins. Another advantage is that these oils have a greater volume resistivity than the aromatic oils previously referred to, and they are less toxic. An advantage of the aromatic oils is that they are more readily blended to form gels. Thus while premixing with a medium speed mixer was preferred with the aromatic oils in order to prevent premature jellation, premixing with a high speed mixer is preferred with the paraffinic oils. For instance in blending Catenex 79 it was found possible to follow high speed premixing immediately with colloid milling to produce a satisfactory gel, whereas if the premixing was performed at medium speed no gel was formed. High speed premixing was not essential however since adequate gels were produced if the premix was allowed to stand for a few days before colloid milling, or if the product of immediate colloid milling was allowed to stand for a day and then repassed through the colloid mill.

In order to meet a specification requiring a greater volume resistivity than was provided by the gels consisting of the paraffinic oils blended with Bentone 38 a satisfactory water blocking gel was formed by dispersing 6 wt% of sub-micron particle sized silica (Aerosil 200) in 94 wt% Catenex 79.

It is to be understood that the foregoing description of specific examples of this invention is made by way of example only and is not to be considered as a limitation on its scope.

What is claimed is:

1. A sheathed stranded cable completely filled with a water blocking composition, said composition being room temperature pumpable and consisting essentially of a gel of a major proportion by weight of a substantially non-volatile petroleum based-oil, in which is dispersed a minor proportion of from 0.5 to 10% by weight of the total composition of a solid gellant which is insoluble in said oil and which does not melt below 100° C, the gel being substantially devoid of any gellant which is soluble in the oil and melts below 100° C.

2. The cable of claim 1 in which the substantially non-volatile petroleum based oil is selected from the group consisting of (a) a high paraffinic carbon content oil having a viscosity of about 35 centistokes at 100° C and (b) an aromatic extract containing aromatic and saturated hydrocarbons and sulfur containing polar compounds.

3. The cable of claim 1 in which the gellant is selected from the group consisting of natural and modified clays, granulated mica and ultrafine silica.

4. The cable of claim 1 in which the non-volatile petroleum based oil is a high paraffinic carbon content oil having a viscosity of about 35 centistokes at 100° C.

5. The cable of claim 1 in which the non-volatile petroleum based oil is an aromatic extract containing aromatic and saturated hydrocarbons and sulfur containing polar compounds.

6. The cable of claim 1 in which the gellant is selected from the group consisting of a bentonite clay based gellant and a sub-micron particle sized silica gellant.

* * * * *